United States Patent
Post et al.

(10) Patent No.: US 8,480,902 B2
(45) Date of Patent: Jul. 9, 2013

(54) BIOFILM REMEDIATION OF ACID MINE DRAINAGE

(75) Inventors: James Christopher Post, Mars, PA (US); Garth David Ehrlich, Pittsburgh, PA (US); John William Costerton, Pittsburgh, PA (US)

(73) Assignee: Allegheny-Singer Research Institute, Pittsburgh, PA (US)

( * ) Notice: Subject to any disclaimer, the term of this patent is extended or adjusted under 35 U.S.C. 154(b) by 319 days.

(21) Appl. No.: 12/829,842

(22) Filed: Jul. 2, 2010

(65) Prior Publication Data

US 2011/0100906 A1   May 5, 2011

Related U.S. Application Data

(60) Provisional application No. 61/222,689, filed on Jul. 2, 2009.

(51) Int. Cl.
   *C02F 3/00*      (2006.01)

(52) U.S. Cl.
   USPC ........... 210/610; 210/611; 210/615; 210/616; 210/617

(58) Field of Classification Search
   USPC ................... 210/610, 611, 615–617
   See application file for complete search history.

(56) References Cited

U.S. PATENT DOCUMENTS

| | | | |
|---|---|---|---|
| 5,550,141 A | 8/1996 | Gould et al. | |
| 6,991,405 B2 | 1/2006 | Barrie et al. | |
| 2001/0032725 A1* | 10/2001 | Harrington | 172/128 |
| 2006/0153811 A1 | 7/2006 | Jackson et al. | |
| 2007/0010607 A1 | 1/2007 | Smith et al. | |
| 2008/0095812 A1 | 4/2008 | Code | |
| 2009/0004728 A1* | 1/2009 | Kohr | 435/262 |

OTHER PUBLICATIONS

M.S. Waters, et al., "Early Detection of oxidized surfaces using *Shewanella oneidensis* MR-1 as a tool", Biofouling vol. 25, No. 2, Feb. 2009, 163-172.

M. Kolari, et al., "Firm but Slippery Attachment of *Deinococcus geothermalis*", Journal of Bacteriology, May 2002, p. 2473-2480.

Laopaiboon et al., "Effect of Glutaraldehyde Biocide on Laboratory-Scale Rotating Biological Contactors and Biocide Efficacy", Electronic Journal of Biotechnology ISSN: 0717-3458, Jul. 15, 2006, vol. 9 Issue 4, Pontificia Universidad Catolica de Valparaiso, Chile.

Anderson et al., "Stimulating the in Situ Activity of Geobacter Species to Remove Uranium from the Groundwater of a Uranium-Contaminated Aquifer", Applied and Environmental Microbiology, Oct. 2003, 69(10), pp. 5884-5891, American Society for Microbiology.

Haack et al., "Biofilm Hydrous Manganese Oxyhydroxides and Metal Dynamics in Acid Rock Drainage", Environmental Science and Technology, ISSN 0013-936X, 2003, vol. 37, No. 18, pp. 4138-4147, American Chemical Society, Washington D.C.

* cited by examiner

*Primary Examiner* — Chester Barry
(74) *Attorney, Agent, or Firm* — Fox Rothschild LLP

(57) ABSTRACT

A method of prevention of acid rock drainage excludes oxygen from waste rocks that contain ferrous sulfides by building an oxygen bio-barrier over exposed surfaces of the waste rock. The bio-barrier may be formed by applying a slurry to the rock. The slurry may contain several components such as microbial material, one or more nutrients, water or another fluid, and optionally water-absorbent material. The microbial material may include bacteria, algae, fungi or a combination thereof. Additionally, the slurry may contain one or more acid-neutralizing compounds, one or more cellulose-containing substances, and one or more UV protecting agents.

19 Claims, 1 Drawing Sheet

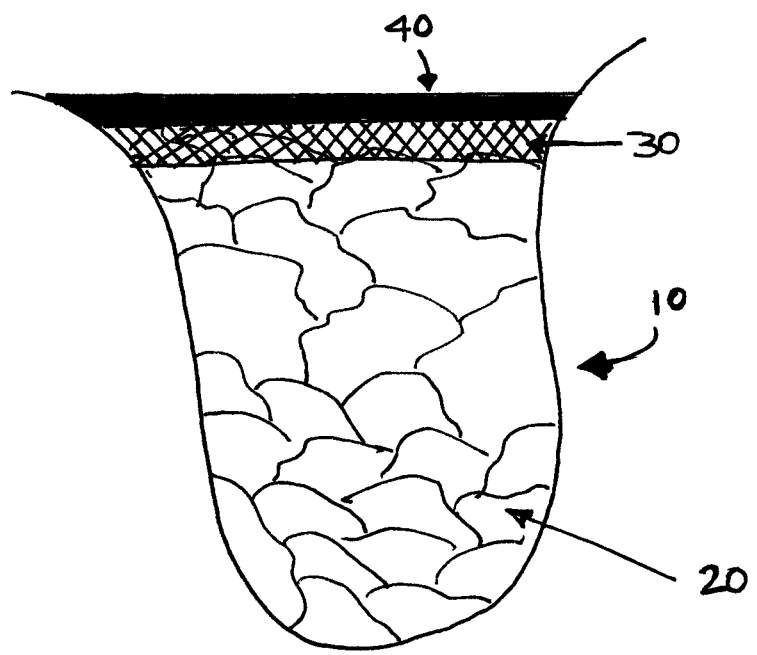

BIOFILM REMEDIATION OF ACID MINE DRAINAGE

CROSS-REFERENCE TO RELATED APPLICATIONS

This patent application claims priority to co-pending U.S. Provisional Patent Application No. 61/222,689, entitled "BIOFILM REMEDIATION OF ACID MINE DRAINAGE", filed on Jul. 2, 2009, which is incorporated herein by reference in its entirety.

Not Applicable

BACKGROUND

Acid mine drainage or acid rock drainage (interchangeably referred to herein as ARD) results from the penetration of oxygen into waste rock that contains ferrous sulfides (pyrites), with the consequent conversion of the sulfites to sulfuric acid. ARD is the outflow of acidic water into the environment, usually from disturbed earth such as mines or large construction sites that contain pyrite and other iron-containing ores. The acidity and precipitation of metal solids disrupts stream ecosystems and kills plant and animal life. Sulfuric acid, produced from the interaction of the water with the rock, extracts additional iron-containing compounds from the waste rock and causes pollution of the affected streams often for miles below the source of the pyrite. Broken rock that occurs from mining and construction activities is especially susceptible to ARD, as the iron and metallic compounds in the exposed areas of the fractured rock may oxidize and be carried away by water that passes over the rock.

The methods and systems described in this document are directed to the prevention of ARD.

SUMMARY

In one embodiment, a method of prevention of ARD by excluding or minimizing exposure of fractured rocks to oxygen is described. The method comprises formation of microbial biofilms on the exposed surfaces of waste rocks that may act as oxygen barriers. The microbial biofilm may contain algae, bacteria, fungi or combinations thereof. The bacterial biofilm may anaerobically metabolize to further exclude oxygen. The microbial materials may be mixed with several components as a "slurry" that may be used to exclude oxygen from the exposed surfaces of rocks. In addition to microbial materials, the slurry may include an adhesive that may become activated upon drying to prevent the washing of the slurry components prior to the establishment of a rock-attached biofilm, fibers, nutrients, water and optionally water-absorbent material. In one embodiment, the nutrients may contain organic matter, phosphates and/or cellulose. Additionally, the slurry may contain acid-neutralizing compounds such as lime. In a further embodiment, the slurry may contain ultraviolet (UV) light-blocking agents to reduce further damage to and fracturing of the rocks.

In other embodiments, the bacteria that are used for ARD remediation include at least one of the following: *Geobacter* or other proteobacteria, and *Shewanella*. In yet another embodiment, the bacteria that are used for ARD remediation include at least one of the following: *Shewanella piezotolerans, Shewanella baltica*. In certain embodiments, at least $10^{12}$ bacteria/ml may be present in the slurry.

BRIEF DESCRIPTION OF THE DRAWINGS

For a fuller understanding of the nature and advantages of the present invention, reference should be made to the following detailed description taken in connection with the accompanying drawings.

FIG. 1 depicts exemplary environment in which a microbial biofilm may be used to prevent the formation of ARD on waste rock.

DETAILED DESCRIPTION

This invention is not limited to the particular processes, compositions, or methodologies described, as these may vary. The terminology used in the description is for the purpose of describing the particular versions or embodiments only, and it is not intended to limit the scope of the present invention which will be limited only by the appended claims. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

As used herein the singular forms "a," "an," and "the" include the plural reference unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

As used herein, all claimed numeric terms are to be read as being preceded by the term, "about," which means plus or minus 10% of the numerical value of the number with which it is being used. Therefore, a claim to "50%" means "about 50%" and encompasses the range of 45%-55%.

Acid mine drainage or acid rock drainage (ARD) results from the penetration of oxygen ($O_2$) into waste rocks that contain ferrous sulfides (pyrites), with the consequent conversion of the sulfides to sulfuric acid. Sulfuric acid extracts more iron compounds from the waste rocks which results in extensive plumes of red iron compounds polluting the affected streams, often for miles below the source of the pyrite.

The methods and systems described in this document are directed to a microbial biofilm-based remediation technology that prevents the formation of sulfuric acid by preventing access of oxygen into the waste rock. The microbial biofilm may contain algae, bacteria, fungi or combinations thereof. The bacterial biofilm may metabolize anaerobically metabolize to further exclude oxygen. As used herein, "biofilm" and "bio-barrier" are interchangeably used.

Specific bacterial strains that may be used for biofilm generation include *Geobacter* and *Shewanella*, which can grow on iron. In yet another embodiment, the bacteria that are used for ARD remediation include at least one of the following: *Vibrio proteolyticus, Shewanella piezotolerans* (with designated GenBank Accession ID: CP000472), *Shewanella baltica* (with designated GenBank Accession IDs: AM743169, CP001252, CP000753, CP000891, and CP000563) and combinations thereof. In another embodiment, the bacteria that are used for bioremediation may include: *Pantoea agglomerans, Vibrio vulnificus* (with designated GenBank Accession IDs: AE016795 and AE016795) and combinations thereof.

In addition, other strains of proteobacteria (of which *Geobacter* is a genus) may be used. *Geobacter* has the additional ability to consume oil-based pollutants and radioactive materials in or on the rock, generating carbon dioxide as a waste product. *Geobacter* and *Shewanella* can derive energy from the oxidation of iron salts and do not require additional nutrients. Both *Shewanella* and *Geobacter*, as well as other biomaterials, may attach to and stabilize the iron compounds to prevent the metals from converting sulfides into sulfuric acid. In one embodiment, specific cultivated bacterial strains and natural bacterial enrichments may be selected that favor the formation of biofilms based on the geometrical rock composition.

In alternative embodiments, the bacterial genera that may be used for ARD remediation may include at least one of the following genera: *Pseudomonas, Aeromonas, Klebsiella, Bacteroides* and a combination thereof. Specific bacterial strains that may be used include *Deinococcus geothermalis* and *Deinococcus radiodurans*. The genome of *Deinococcus geothermalis* has been sequenced and has been designated a GenBank Accession ID: CP000359. The genome of *Deinococcus radiodurans* has been sequenced with designated GenBank Accession ID: AE000513.1 for Chromosome 1, GenBank Accession ID: AE001825.1 for Chromosome 2, GenBank Accession ID: AE001827.1 for R1 plasmid CP1, and GenBank Accession ID: AE001826.1 for plasmid MP1. The genome of metal-reducing bacteria named *Geobacter* FRC-32 has been sequenced with designated GenBank Accession ID: CP001390.

In certain embodiments, the bacteria may be modified with a tag, barcode or other genetic identifier to allow for identifying the source of biofilm. Tagging and barcoding of bacteria can be done by any method known to one skilled in the art such as, but not limited to, by genetic modifications, fluorescent labeling and unique identifier polymers. In yet another embodiment, tagging and/or barcoding of bacteria allows for detection of maturation of biofilm. In such methods unique identifiers such as, but not limited to, genetic modifications, fluorescent labeling and unique polymers are utilized to signal the maturation of biofilm for efficient remediation of ARD. When bacteria are modified to include an identifier, the identifier will be reproduced as the biofilm grows.

Direct examinations of bacteria growing in natural and engineered ecosystems show that these organisms live, almost exclusively, in matrix-enclosed "biofilms" composed of cells (about 15% of volume) embedded in extracellular polymeric substances (about 85% of volume). The viscous adherent nature of these biofilms gives them the property of a "skin-like" layer that tends to exclude oxygen. Bacteria's metabolic activity further depletes oxygen, so that any area under even the thinnest biofilm (about 50 microns) is functionally anaerobic. This anaerobiosis is seen in rich soils, comprised of several layers of hydrated biofilms. However, dry porous soils allow the penetration of oxygen to a depth of several centimeters. Field trials have shown that the placement of bacteria in a subsurface environment, with sufficient nutrients to promote growth and sufficient water to maintain hydration, results in the formation of a "bio-barrier" composed of biofilms that limit water movement and result in deep anaerobic zones.

A bio-barrier applied to the surface of exposed rock may include one or more bacteria strains disposed in a matrix containing DNA, protein and/or carbohydrates, some of which may be produced by the bacteria. Growth in biofilms allows bacteria to remain stationary in any porous ecosystem (i.e., soil), and to prevent oxygen from penetrating the rocks.

A mixture of components, "slurry", may be used to deposit the biomaterials on the exposed rock for the bio-barrier. The slurry may contain a microbial material, one or more nutrients, fibers, a fluid (such as water) and optionally a water-absorbent material. In addition, the slurry may further comprise an adhesive or a tackifier that may become activated upon drying to reduce the washing of the slurry components prior to the establishment of a rock-attached biofilm. Exemplary tackifiers may include starch-derived products, products containing guar gum or plantago, other organic tackifiers, or polyacrylamide tackifiers. The microbial material may contain algae, bacteria, fungi combinations thereof. Optionally, the material may include a combination of single-cell organisms and agglomerated organisms so that the particulate sizes within the slurry are varied. The nutrients may contain organic matter such as cellulose or another polysaccharide, glucose, chitin, and/or phosphates.

In certain embodiments, at least $10^{12}$ bacteria/ml may be present in the slurry.

In other embodiments, the microbial material may make up greater than 1%, greater than 5%, greater than 10%, or more of the slurry. In addition, the microbial material may be provided as up to 1%, up to 5%, up to 10%, up to 15%, up to 20%, up to 25%, up to 40%, up to 50%, or more of the slurry. In another embodiments, the slurry contains about 20% to 30% of solid material and the remaining composition is in a fluid form to prevent or reduce clogging.

Additionally, the slurry may contain acid-neutralizing compounds such as lime. In a further embodiment, the slurry may contain agents that block, scatter, or absorb ultraviolet (UV) light to reduce further fracturing of the rocks. For example, Pseudomonas aeruginosa strain may provide UV absorbing capability as shown by Elasri et al., Applied and Environmental Microbiology, 1999, p. 2025-2031, contents are which is incorporated by reference in its entirety herein. In another embodiment, the slurry may contain a mixture of bacteria, algae and fungi in various sized flocks, flakes or aggregations, tailored to optimize coverage, adherence or penetration of the various treated surfaces.

In another embodiment, the slurry may be applied to at least 5%, but not more than 50% of an exposed area of the waste rocks. In another embodiment, the slurry may be applied to at least 5%, but not more than 40% of an exposed area of the waste rocks. In another embodiment, the slurry may be applied to at least 5%, but not more than 30% of an exposed area of the waste rocks. In another embodiment, the slurry may be applied to at least 5%, but not more than 20% of an exposed area of the waste rocks. In such embodiments, the biofilm will grow and expand to cover the remaining exposed areas. The slurry may be applied by pouring, spraying, coating, painting, drizzling, or other methods. For example, the slurry may be sprayed, in the form of a mist, so that it lands on the rocks and the flow shear does not cause it to wash away during application. In an alternative embodiment, the slurry may be applied by using a "hydroseeder". In such embodiments, a truck mounted or a trailer mounted tank may be used which contains the slurry. The slurry may be pumped from the tank through a broad spray nozzle that substantially uniformly disperses the slurry under high pressure to allow penetration into the mine tailings.

In another embodiment, the biofilm is formed at least one day after the slurry is applied through natural growth of the bacteria by reproduction. The nutrients, such as organic matter, phosphates and/or cellulose, will promote growth and reproduction by the bacteria to form the biofilm. In another embodiment, the biofilm is formed at least 3 days after the slurry is applied. In another embodiment, the biofilm is formed at least 5 days after the slurry is applied.

Microbial materials contained in the slurry may form a biofilm to seal the surfaces of the waste rock to ensure that little or no oxygen from ambient air can penetrate to break down pyrite to form sulfuric acid and iron salts. Thus, water that flows over the exposed area of the rock will not substantially interact with the rocks to extract iron or iron compounds. Where the source of the sulfide-rich rock is in a contained system, as in the adit of a disused mine, an oxygen barrier may be built by producing large amounts of metabolically-active microbial biofilm at the first available water surface in the system.

Every water surface has a hypolimnion composed of microbial biofilms. In one embodiment, this biological layer may be thickened by: 1) adding bacteria to the layer to block oxygen; and 2) providing large amounts of organic matter that will float at the surface, and gradually release soluble organic components to promote bacterial growth and biofilm development. Manure containing straw may be an excellent source of nutrients, since some organic molecules are immediately available, while others need digestion and are released much more slowly.

In another embodiment, the formation of oxygen-excluding biofilms may be promoted on the surfaces of waste rocks that are piled adjacent to streams. This formation may be accomplished by seeding the area with iron-reducing bacteria that have been identified in the laboratory, such as *Geobacter* and *Shewanella*. Additionally, the nutrient requirements for biofilm development on each ecosystem may be analyzed, and both the organic and mineral components necessary for the development of biofilms of sufficient thickness and metabolic activity may be provided to achieve optimal exclusion of oxygen from the pyrite in the waste rock.

In yet another embodiment, a "desert varnish" environment, of the type that has been described in very dry environments, such as the dry valleys in Antarctica, may be produced by spraying a nutrient mixture on all exposed surfaces in waste rock piles. In some embodiments, such as situations shown in FIG. 1 in which waste rock is stored in thick piles or in depressed locations 10 with well-defined boundaries, oxygen access may be prevented by covering the waste rock 20 with a biofilm 30. The biofilm may then by covered by a layer of rich soil 40. The soil may be any appropriate thickness, such as approximately 1 meter, and maintenance of the biofilm may be promoted by keeping the soil well watered. This ensures that acid rock drainage is prevented at the source, by systematically excluding oxygen from the sulfuric pyrite in all forms of waste rock.

In yet another embodiment, bacterial strains may be identified in the laboratory that form iron and sulfur reducing biofilms, exclude oxygen, and survive and persist on acid rock formations. In an additional embodiment, specific bacteria to Pennsylvania pyrites may be identified.

In a further embodiment, water and nutrient retention systems to support application of the bacteria to exposed rocks are identified. The slurry components may be adjusted based on the location and components or the waste rocks.

Slurries may be applied to a waste rock environment using any now or hereafter known methodology. For example, a device may project a spray of the slurry from a container which may be carried by a human (such as in a backpack), or from a ground vehicles, or from an aerial delivery mechanism such as a plane or helicopter of the type that sprays liquid fertilizer.

The above-disclosed and other features and functions, or alternatives thereof, may be desirably combined into many other embodiments, which are intended to be encompassed by the present disclosure. Various presently unforeseen or unanticipated alternatives, modifications, variations or improvements therein may be subsequently made by those skilled in the art which are also intended to be encompassed by the disclosed embodiments.

The invention claimed is:

1. A method of addressing acid rock drainage, comprising:
   preparing a slurry comprising a microbial material, a nutrient, and a fluid, wherein the microbial material comprises a bacteria that comprises *Shewanella piezotolerans*, *Shewanella baltica* or *Geobacter* FRC-32;
   applying the slurry to at least 5% of an exposed area of waste rocks from a mining operation; and
   allowing the slurry to expand over the rock and form a biofilm that provides an oxygen barrier between the exposed area and ambient air so that water that flows over the exposed area will not substantially interact with the rocks to extract iron or iron compounds from the rocks.

2. The method of claim 1, wherein the bacteria comprise at least one of the following: *Deinococcus geothermalis*, *Deinococcus radiodurans*, *Vibrio proteolyticus*, *Pantoea agglomerans*, and *Vibrio vulnificus*.

3. The method of claim 1, wherein the nutrient comprises a phosphate, organic matter, or a combination thereof.

4. The method of claim 1, wherein the slurry further comprises an acid- neutralizing compound.

5. The method of claim 1, wherein the slurry further comprises an agent that blocks, scatters, or absorbs ultraviolet light.

6. The method of claim 1, further comprising applying the slurry to at least 5%, but not more than 50% of an exposed surface area of the waste rocks.

7. The method of claim 1, wherein the applying comprises spraying the slurry over the exposed area.

8. The method of claim 1, wherein at least $10^{12}$ bacteria/ml are present in the slurry.

9. The method of claim 1, further comprising applying a layer of soil over the biofilm.

10. The method of claim 1, wherein the slurry further comprises an adhesive that becomes activated upon drying on the surface of the rocks.

11. A method of addressing acid rock drainage, comprising:
    preparing a slurry comprising a microbial material, a nutrient, and a fluid;
    applying the slurry to at least 5% of an exposed area of waste rocks from a mining operation; and
    allowing the slurry to expand over the rock and form a biofilm that provides an oxygen barrier between the exposed area and ambient air, and applying a layer of soil over the biofilm, so that water that flows over the exposed area will not substantially interact with the rocks to extract iron or iron compounds from the rocks.

12. The method of claim 11, wherein:
    the bacteria comprise at least one of the following: *Deinococcus geothermalis*, *Deinococcus radiodurans*, *Vibrio proteolyticus*, *Pantoea agglomerans*, and *Vibrio vulnificus*; and
    the nutrient comprises a phosphate, organic matter, or a combination thereof.

13. The method of claim 11, wherein the slurry further comprises at least one of the following:
    an acid-neutralizing compound; or
    an agent that blocks, scatters, or absorbs ultraviolet light.

14. The method of claim 11, wherein at least $10^{12}$ bacteria/ml are present in the slurry.

15. The method of claim 11, wherein the slurry further comprises an adhesive that becomes activated upon drying on the surface of the rocks.

16. A method of addressing acid rock drainage, comprising:
   preparing a slurry comprising a microbial material, a nutrient, an adhesive and a fluid;
   applying the slurry to at least 5% of an exposed area of waste rocks from a mining operation, wherein the adhesive becomes activated upon drying on the surface of the rocks; and
   allowing the slurry to expand over the rock and form a biofilm that provides an oxygen barrier between the exposed area and ambient air so that water that flows over the exposed area will not substantially interact with the rocks to extract iron or iron compounds from the rocks.

17. The method of claim 16, wherein:
   the bacteria comprise at least one of the following: *Deinococcus geothermalis, Deinococcus radiodurans, Vibrio proteolyticus, Pantoea agglomerans*, and *Vibrio vulnificus*; and
   the nutrient comprises a phosphate, organic matter, or a combination thereof.

18. The method of claim 16, wherein the slurry further comprises at least one of the following:
   an acid-neutralizing compound; or
   an agent that blocks, scatters, or absorbs ultraviolet light.

19. The method of claim 16, wherein at least $10^{12}$ bacteria/ml are present in the slurry.

* * * * *